United States Patent [19]

Himuro

[11] Patent Number: 5,423,364
[45] Date of Patent: * Jun. 13, 1995

[54] PNEUMATIC TIRES

[75] Inventor: Yasuo Himuro, Tachikawa, Japan

[73] Assignee: Bridgestone Corporation, Tokyo, Japan

[*] Notice: The portion of the term of this patent subsequent to Nov. 2, 2010 has been disclaimed.

[21] Appl. No.: 41,035

[22] Filed: Mar. 31, 1993

[30] Foreign Application Priority Data

Apr. 8, 1992 [JP] Japan .................. 4-087193

[51] Int. Cl.⁶ .......................................... B60C 103/04
[52] U.S. Cl. .................. 152/209 R; 152/209 A
[58] Field of Search .......... 152/209 R, 209 D, 209 A; D12/146–150, 145

[56] References Cited

U.S. PATENT DOCUMENTS

| D. 292,079 | 9/1987 | Ikeda ................... D12/145 |
| D. 340,895 | 11/1993 | Himuro et al. ............ D12/147 |
| 4,953,604 | 9/1990 | Shepler et al. ............ 152/209 R |
| 5,105,864 | 4/1992 | Watanabe et al. . |
| 5,234,042 | 8/1993 | Kuhr et al. ............... 152/209 R |

FOREIGN PATENT DOCUMENTS

| 0064934 | 11/1982 | European Pat. Off. . |
| 2655920 | 6/1991 | France . |
| 002986 | 5/1991 | Germany . |
| 9002986 | 5/1991 | Germany . |
| 4112046 | 10/1991 | Germany . |
| 4220677 | 1/1993 | Germany . |
| 419202 | 1/1992 | Japan . |
| 443105 | 2/1992 | Japan . |
| 4043105 | 2/1992 | Japan . |
| 4078604 | 3/1992 | Japan . |
| 4126612 | 4/1992 | Japan . |
| 4154408 | 5/1992 | Japan . |
| 4218410 | 8/1992 | Japan . |

Primary Examiner—Steven D. Maki
Attorney, Agent, or Firm—Sughrue, Mion, Zinn, Macpeak & Seas

[57] ABSTRACT

A pneumatic tire has a tread pattern defined by at least one straight circumferential groove and a plurality of lateral grooves extending from tread end toward the vicinity of a circumferential line perpendicular to a meridional line of the tire and extending slantwise and upward toward the tread end. In this tire, the lateral groove is composed of a main lateral groove portion and an auxiliary lateral groove portion. The main lateral groove portion is comprised of a steep slant segment, a dull slant segment and a curved segment smoothly connecting these slant segments and the auxiliary lateral groove portion extends substantially in parallel with the dull slant segment and opens to the tread end and the steep slant segment.

4 Claims, 4 Drawing Sheets

FIG_3
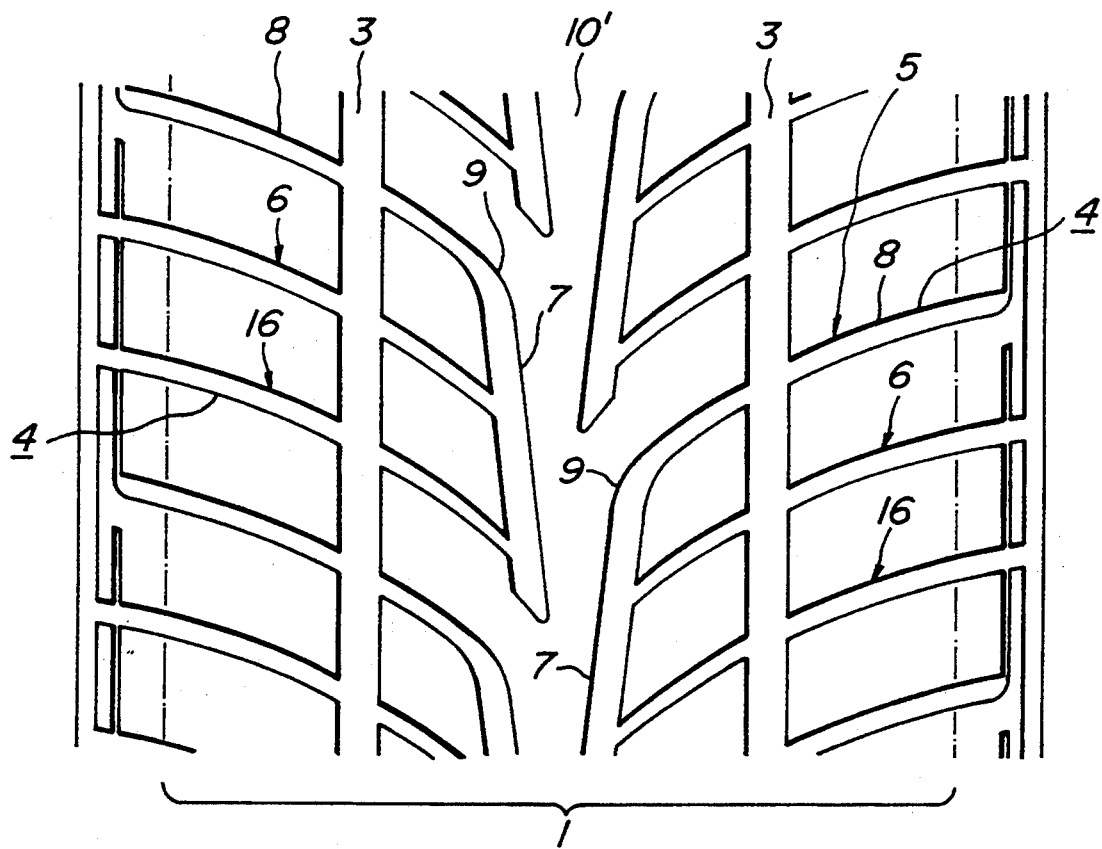

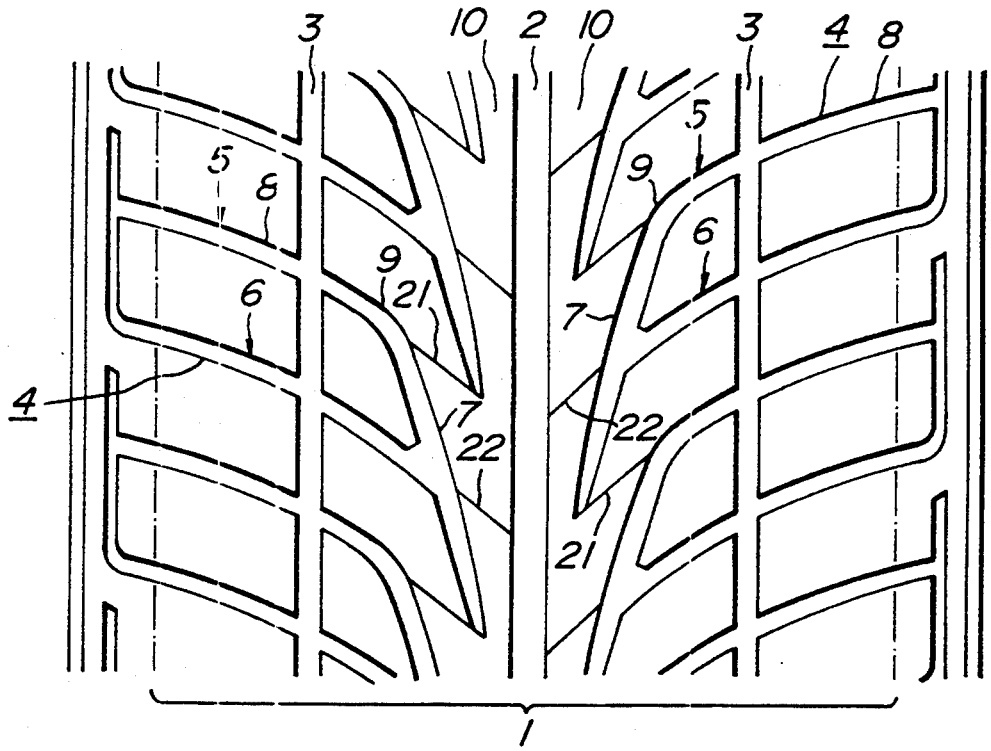
FIG_4
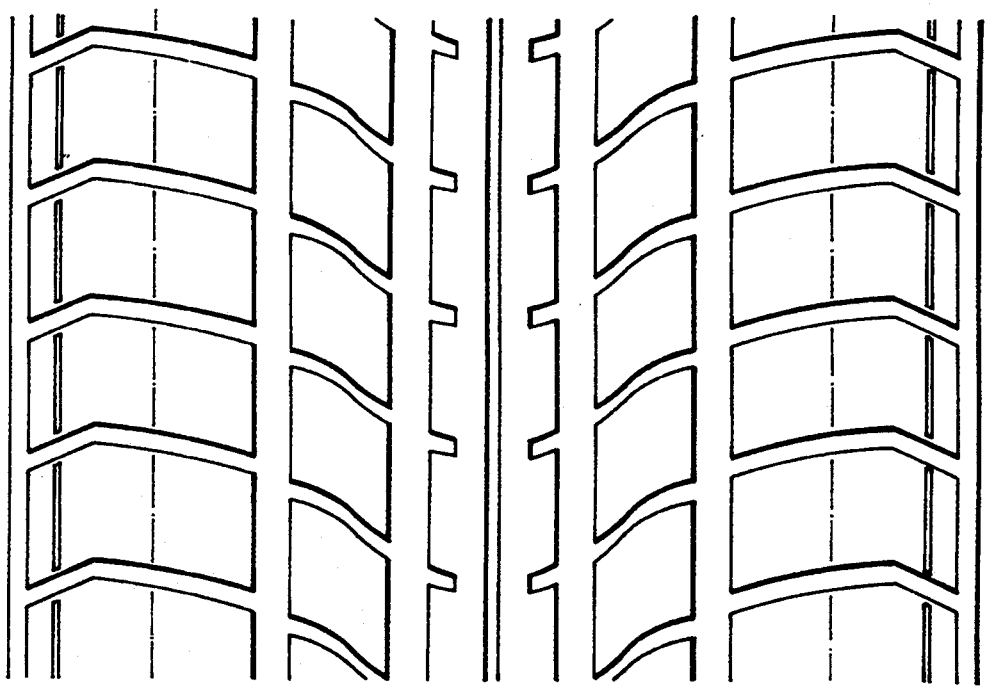
FIG_5
PRIOR ART

PNEUMATIC TIRES

BACKGROUND OF THE INVENTION

1. Field of the Invention

This invention relates to a pneumatic tire, and more particularly to a high-running performance tire having an effectively improved resistance to hydroplaining on wet road surface while maintaining a steering stability on dry road surface at a sufficiently high level.

2. Description of Related Art

As this type of the tire, there is widely known a combination of a plurality of straight circumferential grooves extending in a circumferential direction of a tread and a plurality of slant grooves extending slantwise and upward from the vicinity of a center of the tread toward a tread end in a tread pattern viewed from a front of the tire mounted onto a vehicle.

In such a conventional tire, when a negative ratio of the groove is increased or an angle of each slant groove inclined with respect to the circumferential direction of the tread is made small in order to improve the resistance to hydroplaining on wet road surface, problems result in that the effective ground contact area of land portions in the tread is decreased and the rigidity of a block against force in widthwise direction of the tread is reduced to lower the steering stability on dry road surface.

SUMMARY OF THE INVENTION

It is, therefore, an object of the invention to solve the aforementioned problems of the conventional technique and to provide a pneumatic tire capable of sufficiently improving the resistance to hydroplaining during the straight running and turning while damaging the steering stability on dry road surface by mainly improving the lateral grooves extending in the widthwise direction of the tread.

According to the invention, there is the provision of a pneumatic tire having a tread pattern defined by at least one straight circumferential groove extending substantially in a circumferential direction of a tread and a plurality of lateral grooves each extending from at least an end of the tread toward a circumferential line perpendicular to a meridional line of the tire and extending slantwise and outward from the circumferential line toward the tread end viewed from a front of the tire mounted onto a vehicle, characterized in that said lateral groove is composed of a main lateral groove portion and an auxiliary lateral groove portion, and said main lateral portion is comprised of a steep slant segment extending in the vicinity of the circumferential line at an inclination angle of 5°-30° with respect to the circumferential direction of the tire, a shallow slant segment extending toward the vicinity of the tread end at an inclination angle of 60°-80° with respect to the circumferential direction and a curved segment smoothly connecting these slant segments with each other, and said auxiliary lateral groove portion is a slant groove portion extending substantially in parallel with said dull slant segment and opening to each of said tread end and said steep slant segment.

The term "circumferential line perpendicular to the meridional line of the tire" used herein means an equatorial line of the tire and a line parallel with the equatorial line.

In the preferred embodiments of the invention, each of the lateral groove is comprised of one main lateral groove portion and two auxiliary lateral groove portions, and the lateral grooves are arranged on both sides with respect to the circumferential line, and at least one straight circumferential groove having a width wider than those of the main lateral groove portion and the auxiliary lateral groove portion and extending across the shallow slant segment of the main lateral groove portion and the auxiliary lateral groove portion is arranged between the circumferential line and the tread end facing an inside of a vehicle when the tire is mounted on the vehicle, and the width of the steep slant segment of the main lateral groove portion is wider than that of the shallow slant groove segment thereof.

BRIEF DESCRIPTION OF THE DRAWINGS

The invention will be described with reference to the accompanying drawings, wherein:

FIG. 3 is a schematic view of a third embodiment of the tread pattern according to the invention;

FIG. 4 is a schematic view of a fourth embodiment of the tread pattern according to the invention; and FIG. 5 is a schematic view of the conventional tread pattern.

DESCRIPTION OF THE PREFERRED EMBODIMENTS

Figure 1:
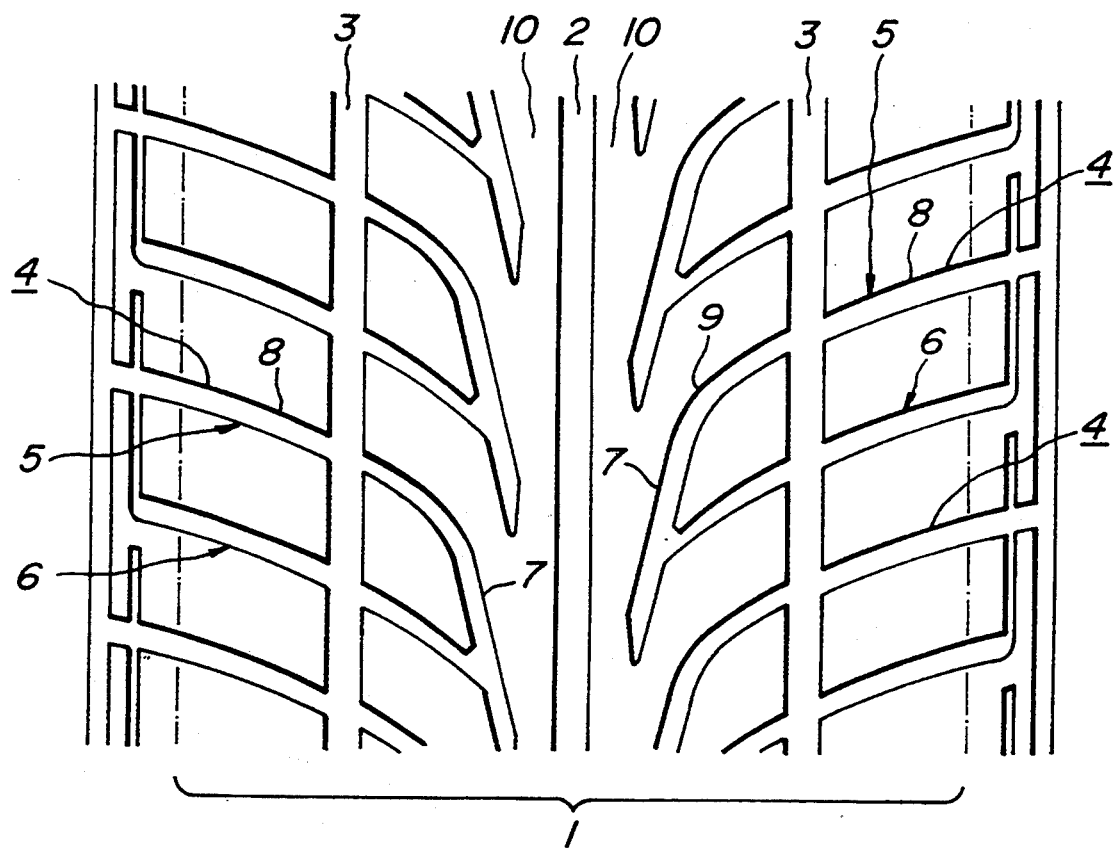
FIG. 1 is a schematic view of a first embodiment of the tread pattern according to the invention.

In the pneumatic tire according to the invention, the drainage effect can be sufficiently improved by locating the steep slant segment of the main lateral groove portion at a region extending in the vicinity of the circumferential line and largely exerting upon the resistance to hydroplaining.

Further, the steep slant segment contacts the ground to cut water film in the stepping-in of the rotating tire, so that the rising of blocks defined in the tread through hydraulic pressure can effectively be prevented. Moreover, the steep slant segment discharges water flowing therein slantly and laterally, so that the amount of water discharged ahead the tire can be effectively reduced.

On the other hand, the shallow slant segment of the main lateral groove portion and the auxiliary lateral groove portion are located at a region extending toward the vicinity of the tread end and largely exerting upon the steering stability on dry road surface, whereby the ground contacting property of the tire is sufficiently improved. Also the high rigidity of the blocks against force in the widthwise direction of the tread is ensured and at the same time water is discharged rapidly and efficiently from the vicinity of the circumferential line toward the side of the tread end.

These effects become particularly conspicuous when a plurality of the above lateral grooves are arranged on both sides with respect to the circumferential line.

Further, when two auxiliary lateral groove portions are opened to the single main lateral groove portion, the drainage property can be more further improved. This is true even when a straight circumferential groove having a width wider than those of the main lateral groove portion and the auxiliary lateral groove portion is arranged in a region of the tread facing to an inside of a vehicle at a state of mounting the tire on the vehicle. In the latter case, the straight circumferential groove is located at the inside of the vehicle, so that a fear of lowering the block rigidity and hence the steering stability can sufficiently be removed.

Moreover, when the width of the steep slant segment in the main lateral groove portion is made wider than that of the shallow slant segment, a greater amount of water can be housed in the steep slant segment to further enhance drainage efficiency.

In the main lateral groove portion, the reason why the inclination angle of the steep slant segment with respect to the circumferential direction of the tread is within a range of 5°–30°. This is due to the fact that when the inclination angle is less than 5° the distance between adjoining steep slant segments in the circumferential direction becomes narrower to make the rigidity of land portions insufficient and hence there are caused problems such as uneven wear and the like. When it exceeds 30°, the drainage efficiency considerably lowers. Further, the reason why the inclination angle of the shallow slant segment with respect to the circumferential direction of the tread is within a range of 60°–80° is due to the fact that when the inclination angle is less than 60°, the sufficient block rigidity against input force during the cornering can not be maintained. When it exceeds 80°, the drainage property in a ground contacting direction is considerably degraded to lose the advantages of the directional tread pattern.

FIG. 1 illustrates a first embodiment of the tread pattern in the tire according to the invention, in which the circumferential line perpendicular to the meridional line of the tire is coincident with the equatorial line of the tire or the tread center.

In this tire, a straight circumferential groove 2 passing the equatorial line of the tire is arranged in a central portion of a ground contact area 1 of the tread, and a straight circumferential groove 3 is arranged in each side portion of the ground contact area 1. Viewed from the front of the tire mounted onto a vehicle as shown in FIG. 1, a plurality of lateral grooves 4 extend slantwise and upward from the vicinity of the tread center toward each tread end and open to the tread end. The grooves 4 are arranged at given spaces in the circumferential direction of the tread.

Each of the lateral grooves 4 is composed of a main lateral groove portion 5 and an auxiliary lateral groove portion 6. The main lateral groove portion 5 is comprised of a steep slant segment 7 extending in the central portion of the tread at an inclination angle of 5°–30° with respect to the circumferential direction of the tread, a shallow slant segment 8 extending in each side portion of the tread at an inclination angle of 60°–80° with respect to the circumferential direction, and a curved segment 9 smoothly connecting slant segments 7, 8 with each other. On the other hand, the auxiliary lateral groove portion 6 is a slant groove portion extending substantially in parallel with the shallow slant segment 8 of the main lateral groove portion 5 beneath the main lateral groove portion 5 and opening to the tread end and the steep slant segment 7 of the main lateral groove portion 5.

In this embodiment, the width of the steep slant segment 7 in the main lateral groove portion 5 is somewhat wider than that of the shallow slant segment 8.

Further, a circumferential rib 10 is formed between the straight circumferential groove 2 and a row of the lateral grooves 4 arranged in the circumferential direction so as to have a sawtooth-like shape.

According to the tire of the above structure, the resistance to hydroplaining can effectively be improved while maintaining the steering stability on dry road surface at a sufficiently high level under the action of the lateral grooves 4 as previously mentioned.

In such a tire, the three straight circumferential grooves 2, 3 are arranged in the ground contact area 1, so that the drainage property can be more improved.

Figure 2:
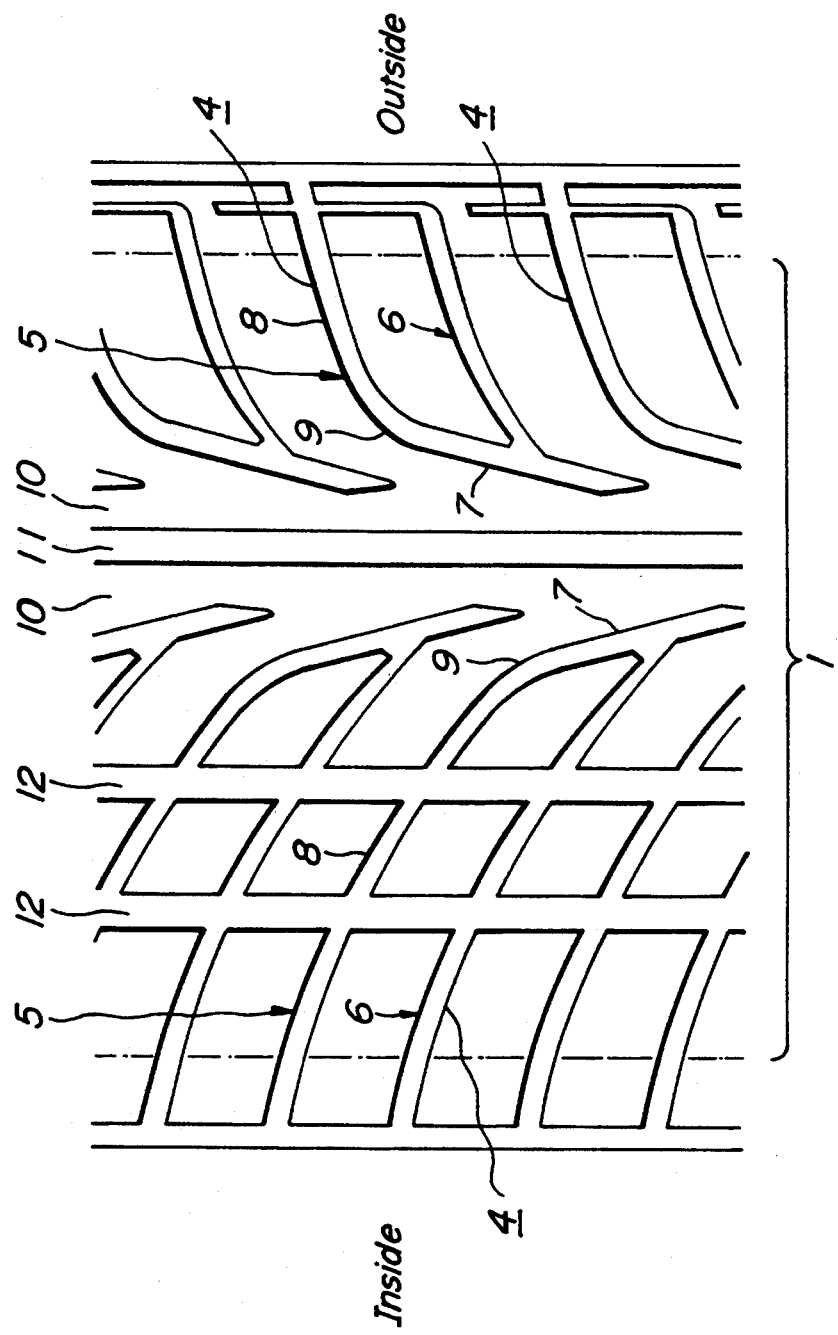
FIG. 2 is a schematic view of a second embodiment of the tread pattern according to the invention.

FIG. 2 illustrates second embodiment of the tread pattern in the tire according to the invention, and has substantially the same structure as in the first embodiment except that the circumferential line perpendicular to the meridional line of the tire is somewhat offset from the tread center toward an outside of a vehicle at a state of mounting the tire onto the vehicle. A straight circumferential groove 11 is arranged at a position corresponding to the circumferential line and two straight circumferential grooves 12 each extending across the dull slant segment 8 of the main lateral groove portion 5 and having a width wider than those of the main lateral groove portion 5. The auxiliary lateral groove portion 6 is arranged in a region between the circumferential line and the tread end facing to the inside of the vehicle.

Even in this embodiment, substantially the same function and effect as in the first embodiment can be obtained under the lateral grooves 4. In addition, the circumferential groove is not arranged in a region facing to the outside of the vehicle, so that the block rigidity in this region can be increased to further improve the steering stability on dry road surface.

FIG. 3 illustrates a third embodiment of the tread pattern in the tire according to the invention. This tire is different from the tire of the first embodiment in a point that the arrangement of the straight circumferential groove is omitted in the central portion of the tread and the steep slant segment 7 of the main lateral groove portion 5 has a longer extension length and a wider width. Each of the lateral grooves 4 is composed of the main lateral groove portion 5 and two auxiliary lateral portions 6, 16 extending substantially in parallel with each other and with the shallow slant segment 8 and opening to the steep slant segment 7 and the tread end, respectively. In this case, a circumferential rib 10' having the shape similar to that of the circumferential rib 10 is formed in the central portion of the tread between a pair of rows of the lateral grooves 4.

According to the third embodiment, the drainage property can be ensured by the steep slant segment 7 instead of the circumferential groove located in the central portion of the tread. Also a great amount of water can rapidly be discharged by arranging the additional auxiliary lateral groove portion 16.

FIG. 4 shows a fourth embodiment of the tread pattern in the tire according to the invention, in which sipes are added to the circumferential rib 10 in the tread pattern shown in FIG. 1. In this case, a sipe 21 is formed in a region ranging from a shallow slant segment 8 of a first main lateral groove portion 5 to a top of a steep slant segment 7 of an adjoining second main lateral groove portion 5. Also sipe 22 is formed in a region ranging from a middle position of an auxiliary lateral groove portion 6 facing to the steep slant segment 7 of the second main lateral groove portion 5 to the straight circumferential groove 2 located at the tread center and substantially in parallel with the sipe 21. Thus the land portion located at the tread center is made flexible to improve the ground contacting property of the tire.

Next, a comparative test between conventional tire and invention tire will be described with respect to the steering stability on dry road surface and resistance to hydroplaining on wet road surface.

⊙ Test tires having a tire size of 225/50 R16 and a tread ground contact width of 200 mm as mentioned later.

○ Invention tire 1

This tire has a tread pattern shown in FIG. 1, in which the width of each of the straight circumferential grooves 2, 3 is 10 mm, and the steep slant segment 7 of the main lateral groove portion 5 has an inclination angle of 14° with respect to the circumferential direction of the tread and a width of 6.5 mm. Each of the shallow slant segments 8 and the auxiliary lateral groove portion 6 has an inclination angle of 50°-70° with respect to the circumferential direction of the tread and a width of 5-6 mm.

○ Invention tire 2

This tire has a tread pattern shown in FIG. 2, in which each width and inclination angle are the same as in the invention tire 1.

○ Invention tire 3

This tire has a tread pattern shown in FIG. 3, in which the straight circumferential groove 3 has a width of 12 mm, and the steep slant segment 7 of the main lateral groove portion 5 has an inclination angle of 8° with respect to the circumferential direction of the tread and a width of 9 mm. Each of the shallow slant segments 8 and the auxiliary lateral groove portion 6 has an inclination angle of 55°-70° with respect to the circumferential direction of the tread and a width of 5-6 mm.

○ Conventional tire

This tire has a tread pattern shown in FIG. 5 in which the width of the straight circumferential groove is 10 mm and the width of the slant groove is 4-5 mm.

⊙ Test method

The test tire is inflated under an internal pressure of 2.2 kgf/cm² and mounted on a vehicle, which is actually run at two member-riding state.

The steering stability on dry road surface is evaluated by a feeling test of a driver when the vehicle is run on a dry test course under various running modes.

The resistance to hydroplaining in straight running is evaluated by measuring a remaining area of the ground contact area when passing on wet road surface having a water depth of 6 mm, while the resistance to hydroplaining in cornering is evaluated by measuring a lateral gravity during the running on wet road surface having a radius of 100 m.

⊙ Test results

The measured results are shown in Table 1 by an index value on the basis that the conventional tire is 100. The larger the index value, the better the result.

TABLE 1

|  | Conventional tire | Invention tire 1 | Invention tire 2 | Invention tire 3 |
| --- | --- | --- | --- | --- |
| Steering stability on dry road surface | 100 | 100 | 105 | 100 |
| Resistance to hydroplaining in straight running | 100 | 110 | 105 | 110 |
| Resistance to hydroplaining in cornering | 100 | 110 | 105 | 110 |

As seen from Table 1, the resistance to hydroplaining can effectively be improved without lowering the steering stability in all of the invention tires. In the invention tire 2, the steering stability can be further improved by omitting the straight circumferential groove from the region facing to the outside of the vehicle.

As mentioned above, according to the invention, the resistance to hydroplaining on wet road surface can effectively be improved while maintaining the steering stability on dry road surface at a satisfactory level.

What is claimed is:

1. A pneumatic tire comprising: a tread pattern defined by at least one straight circumferential groove extending substantially in a circumferential direction of a tread and a plurality of lateral grooves each extending from at least an end of the tread toward a circumferential line perpendicular to a meridional line of the tire and extending slantwise and outward from the circumferential line toward the tread end viewing from a front of the tire mounted onto a vehicle, said lateral grooves are arranged on both sides with respect to said at least one straight circumferential groove so as not to open into said straight circumferential groove, and each of said lateral grooves is composed of a main lateral groove portion and an auxiliary lateral groove portion, said main lateral groove portion comprised of a steep slant segment extending in the vicinity of the circumferential line at an inclination angle of 5°-30° with respect to the circumferential direction of the tire, a shallow slant segment extending toward the vicinity of the tread end at an inclination angle of 60°-80° with respect to the circumferential direction and a curved segment smoothly connecting said steep slant and shallow slant segments with each other, and said auxiliary lateral groove portion is a slant groove portion extending substantially in parallel with said shallow slant segment and opening to each of said tread end and said steep slant segment, and said main lateral groove portions arranged on both sides with respect to said straight circumferential groove are not connected to each other and adjacent main lateral groove portions in the circumferential direction do not intersect each other.

2. The pneumatic tire according to claim 1, wherein said lateral grooves are arranged on both sides with respect to the circumferential line.

3. The pneumatic tire according to claim 1, wherein at least one straight circumferential groove having a width wider than those of said main lateral groove portion and auxiliary lateral groove portion and extending across said shallow slant segment of said main lateral groove portion and auxiliary lateral groove portion is arranged between said circumferential line and said tread end facing to an inside of a vehicle when the tire is mounted on the vehicle.

4. The pneumatic tire according to claim 1, wherein a width of said steep slant segment of said main lateral groove portion is wider than that of said shallow slant groove segment thereof.

* * * * *

UNITED STATES PATENT AND TRADEMARK OFFICE
CERTIFICATE OF CORRECTION

PATENT NO. : 5,423,364
DATED : June 13, 1995
INVENTOR(S) : Yasuo Himuro

It is certified that error appears in the above-indentified patent and that said Letters Patent is hereby corrected as shown below:

On the title page, after item [73], [*] Notice, should read -- The portion of the term of this patent subsequent to Nov. 2, 2007 --.

Signed and Sealed this

Fourth Day of June, 1996

Attest:

BRUCE LEHMAN

Attesting Officer

Commissioner of Patents and Trademarks